(12) United States Patent
Yoshioka et al.

(10) Patent No.: US 9,505,889 B2
(45) Date of Patent: Nov. 29, 2016

(54) STIMULUS-RESPONSIVE GEL MATERIAL AND METHOD FOR PRODUCING STIMULUS-RESPONSIVE GEL MATERIAL

(71) Applicant: Seiko Epson Corporation, Tokyo (JP)

(72) Inventors: Satomi Yoshioka, Shiojiri (JP); Hiroshi Yagi, Tatsuno (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/618,221

(22) Filed: Feb. 10, 2015

(65) Prior Publication Data

US 2015/0226728 A1 Aug. 13, 2015

(30) Foreign Application Priority Data

Feb. 12, 2014 (JP) ................. 2014-024909

(51) Int. Cl.
| | |
|---|---|
| G01N 21/00 | (2006.01) |
| G01N 21/75 | (2006.01) |
| G01N 21/62 | (2006.01) |
| C07F 5/02 | (2006.01) |
| C07F 9/02 | (2006.01) |
| C08G 83/00 | (2006.01) |

(52) U.S. Cl.
CPC .... C08G 83/001 (2013.01); *Y10T 436/201666* (2015.01)

(58) Field of Classification Search
CPC ...... G01N 15/06; G01N 33/00; G01N 33/48; G01N 21/00; G01N 21/75; G01N 21/62
USPC ...... 422/50, 68.1, 69, 82.05, 88, 91; 436/43; 568/1
See application file for complete search history.

(56) References Cited

U.S. PATENT DOCUMENTS

| | | | |
|---|---|---|---|
| 4,269,605 A | 5/1981 | Dean et al. | |
| 5,512,169 A | 4/1996 | Williams | |
| 5,898,004 A * | 4/1999 | Asher et al. | 436/518 |
| 6,187,599 B1 | 2/2001 | Asher et al. | |
| 8,778,508 B2 * | 7/2014 | Kwong et al. | 428/690 |
| 8,816,035 B2 * | 8/2014 | Leclerc et al. | 528/25 |
| 9,132,097 B2 | 9/2015 | Davis et al. | |
| 2002/0031841 A1 * | 3/2002 | Asher et al. | 436/518 |
| 2002/0106326 A1 * | 8/2002 | Singaram et al. | 424/9.6 |
| 2002/0106810 A1 * | 8/2002 | Singaram et al. | 436/172 |
| 2002/0197724 A1 * | 12/2002 | Noronha et al. | 436/95 |
| 2014/0249203 A1 | 9/2014 | Davis et al. | |

FOREIGN PATENT DOCUMENTS

| | | |
|---|---|---|
| JP | 2001-505236 A | 4/2001 |
| JP | 3342498 B2 | 11/2002 |
| JP | 2015-140410 A | 8/2015 |
| JP | 2015-140411 A | 8/2015 |
| WO | WO-98-19787 A1 | 5/1998 |
| WO | WO-98-41859 A1 | 9/1998 |

OTHER PUBLICATIONS

U.S. Appl. No. 14/618,291, filed Feb. 10, 2015, Satomi Yoshioka et al.
U.S. Appl. No. 14/619,527, filed Feb. 11, 2015, Satomi Yoshioka et al.
Weber et al., "Letter to the Editor: Novel Lactate and pH Biosensor for Skin and Sweat Analysis Based on Single Walled Carbon Nanotubes", Sensors and Actuators B 117 (2006) pp. 308-313.
Morris et al., "Wearable Technology for Bio-Chemical Analysis of Body Fluids During Exercise", 30th Annual International IEEE EMBS Conference, Vancouver, British Colombia, Canada (Aug. 20-24, 2008) pp. 5741-5744.

* cited by examiner

*Primary Examiner* — Brian J Sines
(74) *Attorney, Agent, or Firm* — Harness, Dickey & Pierce, P.L.C.

(57) ABSTRACT

A stimulus-responsive gel material includes: a first polymer containing an OH group and having a network structure; a second polymer having a phenylboronic acid structure; fine particles having an average particle diameter of 10 nm or more and 1000 nm or less; and a solvent, wherein a polymer chain of the second polymer penetrates into the network of the first polymer.

7 Claims, No Drawings

STIMULUS-RESPONSIVE GEL MATERIAL AND METHOD FOR PRODUCING STIMULUS-RESPONSIVE GEL MATERIAL

BACKGROUND

1. Technical Field

The present invention relates to a stimulus-responsive gel material and a method for producing a stimulus-responsive gel material.

2. Related Art

At present, as a method for obtaining in vivo biological information, a biochemical test in which the composition of the blood obtained by blood collection is generally performed. This test is mostly performed in medical institutions.

Above all, a blood glucose sensor has been widely used in diabetic patients, and also a simple lactic acid sensor is getting widely used in athletes.

However, both are test methods involving blood collection using an invasive technique.

On the other hand, as a method using a non-invasive technique, a sensor targeting a component of sweat has been studied (see, for example, Wearable Technology for Bio-Chemical Analysis of Body Fluids During Exercise 30th Annual International IEEE EMBS Conference Vancouver, British Columbia, Canada, Aug. 20-24, 2008, and Novel lactate and pH biosensor for skin and sweat analysis based on single walled carbon nanotubes/Sensors and Actuators B 117 (2006) 308-313).

However, such a method employs an electrode method using a dye or an enzyme and therefore has the following problems: a processing section and a display section for displaying data measured by an electrode are needed; a power source (a battery) for the electrode, the processing section, and the display section is needed; etc., and also has other problems that the structure is complicated and also the weight is large.

Further, the enzyme is generally expensive and is susceptible to temperature, humidity, etc., and therefore hardly exhibits stable properties, and also has a problem that the reliability of quantitative performance is low.

In addition, the enzyme greatly varies in quality among production lots or depending on manufacturers. Further, its properties change greatly over time, and therefore, it is necessary to perform calibration using a standard solution having a known concentration before use.

SUMMARY

An advantage of some aspects of the invention is to provide a stimulus-responsive gel material capable of easily and stably detecting a stimulus intensity (the concentration of a predetermined component or the like) in a wide range, and also to provide a production method capable of efficiently producing a stimulus-responsive gel material capable of easily and stably detecting a stimulus intensity (the concentration of a predetermined component or the like) in a wide range.

A stimulus-responsive gel material according to an aspect of the invention includes: a first polymer containing an OH group and having a network structure; a second polymer having a phenylboronic acid structure; fine particles having an average particle diameter of 10 nm or more and 1000 nm or less; and a solvent, wherein a polymer chain of the second polymer penetrates into the network of the first polymer.

According to this configuration, a stimulus-responsive gel material capable of easily and stably detecting a stimulus intensity (the concentration of a predetermined component or the like) in a wide range can be provided.

In the stimulus-responsive gel material according to the aspect of the invention, it is preferred that the material is capable of being put into the following states: a first state in which the OH group of the first polymer and the phenylboronic acid structure of the second polymer are bonded to each other; and a second state in which the bond between the OH group of the first polymer and the phenylboronic acid structure of the second polymer is dissociated, and the wavelength of a reflected light from the material is different between the first state and the second state.

In the stimulus-responsive gel material according to the aspect of the invention, it is preferred that the second polymer has a network structure.

In the stimulus-responsive gel material according to the aspect of the invention, it is preferred that the material is put into the second state by reacting the phenylboronic acid structure of the second polymer and lactic acid with each other.

In the stimulus-responsive gel material according to the aspect of the invention, it is preferred that the first polymer contains N-hydroxyethylacrylamide as a constituent component.

In the stimulus-responsive gel material according to the aspect of the invention, it is preferred that the second polymer contains acrylamidephenylboronic acid as a constituent component.

In the stimulus-responsive gel material according to the aspect of the invention, it is preferred that when the content of the first polymer is denoted by $X_1$ (mass %) and the content of the second polymer is denoted by $X_2$ (mass %), $X_1$ and $X_2$ satisfy the following relationship: $0.2 \leq X_2/X_1 \leq 8$.

In the stimulus-responsive gel material according to the aspect of the invention, it is preferred that water is contained as the solvent.

A method for producing a stimulus-responsive gel material according to another aspect of the invention includes: a first polymerization step in which a polymerization reaction is performed using a first composition containing a first monomer, a crosslinking agent, and fine particles having an average particle diameter of 10 nm or more and 1000 nm or less to synthesize a first polymer containing the first monomer and the crosslinking agent as constituent components, including an OH group, and having a network structure, whereby a first gel material in which the first polymer and the fine particles are mixed with each other is obtained; and a second polymerization step in which a second composition containing a second monomer is polymerized in the presence of the first gel material, whereby a second polymer is obtained.

According to this configuration, a production method capable of efficiently producing a stimulus-responsive gel material capable of easily and stably detecting a stimulus intensity (the concentration of a predetermined component or the like) in a wide range can be provided.

In the method for producing a stimulus-responsive gel material according to the aspect of the invention, it is preferred that the second composition contains a crosslinking agent.

DESCRIPTION OF EXEMPLARY EMBODIMENTS

Hereinafter, preferred embodiments of the invention will be described in detail.

Stimulus-Responsive Gel Material

First, a stimulus-responsive gel material will be described.

The stimulus-responsive gel material includes a polymeric material (a polymer), fine particles, and a solvent. As described in detail below, as the polymeric material, a first polymer and a second polymer, both of which satisfy predetermined conditions, are contained, and a polymer chain of the second polymer penetrates into the network of the first polymer.

According to such a configuration, by a change in the surrounding environment (the presence or absence of a predetermined stimulus, or a change in the stimulus intensity or the like), a bonding state between the first polymer and the second polymer is changed, and the stimulus-responsive gel material is deformed. By including fine particles, such deformation can be detected as a change in the structural color of colloidal crystals formed by the fine particles.

In this embodiment, a predetermined stimulus can be detected, however, because of being a gel material, as compared with the case of using an enzyme in the past, the stability is high, and also a variation in properties among lots or the like is small. Further, a user or the like can easily and reliably recognize the detected stimulus intensity even if a power source is not used or the structure is not made complicated. In addition, it is not necessary to use an expensive material such as an enzyme, and therefore, this embodiment is advantageous also from the viewpoint of cost.

In the stimulus-responsive gel material, whether or not the second polymer penetrates into the network of the first polymer can be confirmed by observation with a microscope. It is also possible to make a determination by the measurement of a melting point (for example, the measurement of an endothermic peak at the melting point by differential scanning calorimetry (DSC)). More specifically, in the case where the first polymer and the second polymer are in an independent state and have a different melting point from each other, in the measurement of the melting point, when a melting point peak (a melting point peak attributed to a structure in which the first polymer and the second polymer are microscopically integrated with each other due to the penetration of the second polymer into the network of the first polymer) which is different from the melting point peaks of the first polymer and the second polymer is confirmed, it can be determined that the second polymer penetrates into the network of the first polymer.

It is also possible to confirm whether or not the second polymer penetrates into the network of the first polymer by utilizing a difference in solubility between the first polymer and the second polymer. More specifically, for example, in the stimulus-responsive gel material, in the case where an organic solvent which dissolves only one of the first polymer and the second polymer (for example, the solubility (the dissolvable amount per 100 g of the solvent) of one of the first polymer and the second polymer at 25° C. is 1 g/100 g or more, and the solubility (the dissolvable amount per 100 g of the solvent) of the other of the first polymer and the second polymer at 25° C. is 0.01 g/100 g or less) exists, the organic solvent is added to the stimulus-responsive gel material at 25° C. in an amount of 1000 g with respect to 10 g of the stimulus-responsive gel material. Further, the resulting mixture is sufficiently stirred at this temperature, followed by filtration. Further, in the case where the resulting residue is washed with the organic solvent so that the theoretical total amount of the extraction liquid (the total amount of the extraction liquid when assuming that the solvent does not volatilize during filtration) is 200 times (mass basis) as much as that of the stimulus-responsive gel material used, when it is confirmed that the ratio (($W_2/W_1$)×100) of the amount ($W_2$ (g)) of a component soluble in the organic solvent of the first polymer and the second polymer contained in the extraction liquid to the contained amount ($W_1$ (g)) of a component soluble in the organic solvent of the first polymer and the second polymer contained in the stimulus-responsive gel material mixed with the organic solvent contained in the extraction liquid is a predetermined value or less (preferably 10 mass % or less, more preferably 1 mass % or less), it can be determined that the second polymer penetrates into the network of the first polymer.

Further, whether or not the second polymer penetrates into the network of the first polymer can also be confirmed by observing the structure of the first polymer and the second polymer with a microscope. More specifically, for example, with respect to the stimulus-responsive gel material, a sample of a cross section of the stimulus-responsive gel material is prepared by cutting the stimulus-responsive gel material in a state where it is frozen with liquid nitrogen or by cryo-FIB, and observation is performed by cryo-SEM. At this time, when an island structure or a grain is not observed, it can be determined that the second polymer penetrates into the network of the first polymer. Further, by performing a mapping analysis of the following elements: carbon, oxygen, and boron using an energy-dispersive x-ray spectrometer (EDX), more detailed observation can be achieved, and it can be determined that the second polymer penetrates into the network of the first polymer.

Polymeric Material (Polymer)

The stimulus-responsive gel material includes as the polymeric material, a first polymer containing an OH group (a hydroxy group to be bonded to a carbon atom) and having a network structure and a second polymer having a phenylboronic acid structure.

By including the first polymer containing an OH group and having a network structure and the second polymer having a phenylboronic acid structure in this manner, the stimulus-responsive gel material can be put into a first state in which the OH group of the first polymer and the phenylboronic acid structure of the second polymer are bonded to each other, and a second state in which the bond between the OH group of the first polymer and the phenylboronic acid structure of the second polymer is dissociated. The conversion of the state in this manner causes the deformation of the stimulus-responsive gel material, and as a result, the wavelength of a reflected light from the stimulus-responsive gel material changes according to the state.

The conversion of these states occurs by a change in the surrounding environment (the presence or absence of a predetermined stimulus, or a change in the stimulus intensity or the like). Among a number of molecules (first polymer molecules and second polymer molecules) contained in the stimulus-responsive gel material, the ratio of the molecules which are put into the first state to the molecules which are put into the second state changes in a gradient manner according to the stimulus intensity.

Therefore, the stimulus intensity can be quantitatively detected with higher reliability.

Further, by the penetration of a polymer chain of the second polymer into the network of the first polymer, in the case where the stimulus-responsive gel material is locally deformed, the deformation is efficiently transmitted also to the surroundings, and as a result, the whole stimulus-responsive gel material is highly uniformly deformed, and thus, a variation in structural color at each site of the stimulus-responsive gel material is also suppressed. As a result, the stimulus intensity to be detected (for example, the concentration of a predetermined component or the like) can be easily and accurately determined. In other words, the stimulus-responsive gel material has excellent quantitative performance for a stimulus intensity.

The OH group of the first polymer and the phenylboronic acid structure of the second polymer have high reactivity, and the material can be put into the first state in which these are bonded to each other, and therefore, a structure in which the polymer chain of the second polymer penetrates into the network of the first polymer is not easily destroyed and is maintained stably over a long period of time. Therefore, the detection of a predetermined stimulus can be stably performed over a long period of time. That is, the stimulus-responsive gel material has excellent durability.

It is preferred that the stimulus-responsive gel material is put into the second state by reacting the phenylboronic acid structure of the second polymer and lactic acid with each other.

The stimulus-responsive gel material enables the detection and quantitative determination with particularly high sensitivity with respect to lactic acid among a variety of stimuli in a particularly wide concentration range. In the past, the detection and quantitative determination of lactic acid used also an enzyme in most cases, and there was no stimulus-responsive gel material which can be favorably applied to the detection and quantitative determination of lactic acid. In light of the above circumstances, by using the stimulus-responsive gel material of this embodiment in the detection and quantitative determination of lactic acid, the effect is remarkably exhibited.

It is considered that the reason why the stimulus-responsive gel material of this embodiment shows high sensitivity for lactic acid is as follows. That is, in the case where the stimulus-responsive gel material is configured to detect lactic acid, when the concentration of lactic acid is low, the ratio of the stimulus-responsive gel material which is put into the first state in which the OH group of the first polymer and the phenylboronic acid structure of the second polymer are bonded to each other is high. On the other hand, when the concentration of lactic acid is increased, the bond between the OH group of the first polymer and the phenylboronic acid structure is replaced by a bond between lactic acid and the phenylboronic acid structure with extremely high reactivity. This is considered to be because lactic acid is a compound which has an α-hydroxycarboxylic acid structure, and has particularly high reactivity with a phenylboronic acid structure, and also has a small molecular size, and therefore, in the stimulus-responsive gel material, lactic acid can easily come close to the phenylboronic acid structure of the second polymer.

When the phenylboronic acid structure of the second polymer and the lactic acid are reacted with each other, as described above, in the second state, the stimulus-responsive gel material has a structure in which the phenylboronic acid structure and lactic acid are bonded to each other, however, an ester group contained in this structure interacts with the OH group of the first polymer. Due to this, also in the second state, the second polymer hardly falls out of the network of the first polymer. Therefore, in the case where the stimulus-responsive gel material is configured to react the phenylboronic acid structure of the second polymer and lactic acid with each other, the stimulus-responsive gel material has particularly excellent durability. In addition, by causing the second polymer to penetrate into the network of the first polymer, the molecular chain of the second polymer can be brought extremely close to the molecular chain of the first polymer, and therefore, the conversion between the first state and the second state is more favorably achieved.

In the following description, a case where the stimulus-responsive gel material is put into the second state by reacting the phenylboronic acid structure of the second polymer and lactic acid with each other, and is used for the detection and quantitative determination of lactic acid will be mainly described.

First Polymer

The first polymer has an OH group (a hydroxy group).

The OH group may be introduced after a polymerizable compound (a monomer or the like) as a constituent component of the polymer is polymerized, however, it is preferred that the polymerizable compound serving as a constituent component of the polymer has the OH group.

According to this, the ratio of the OH group of the first polymer or the like can be easily and reliably adjusted.

Examples of the monomer having an OH group, which constitutes the first polymer, include N-hydroxyethylacrylamide, 2-hydroxyethylmethacrylate, glycerol monomethacrylate, 2-hydroxy-1-acryloxy-3-methacryloxypropane, and 2-hydroxy-1,3-dimethacryloxypropane, and one type or a combination of two or more types selected therefrom can be used. However, the first polymer preferably contains N-hydroxyethylacrylamide as a constituent component.

According to this, the conversion between the first state and the second state in accordance with a change in the environment where the stimulus-responsive gel material is placed (particularly, a change in the concentration of lactic acid) is more favorably achieved, and the detection and quantitative determination of a stimulus intensity (particularly, the concentration of lactic acid) can be more stably performed in a wider range. Further, the ability to retain the solvent of the stimulus-responsive gel material can be particularly enhanced, and thus, a favorable gel state can be maintained stably over a long period of time.

The content of the monomer having an OH group in the first polymer is preferably 54 mol % or more and 99 mol % or less, more preferably 65 mol % or more and 98.5 mol % or less, further more preferably 76 mol % or more and 98 mol % or less.

According to this, while more remarkably exhibiting the effect of the first polymer because of having an OH group as described above, the effect of components other than the monomer having an OH group (the below-described cross-linking agent, a monomer having no OH group, and the like) can be sufficiently exhibited.

The first polymer may contain a monomer having no OH group as a constituent component thereof. According to this, the ratio of the OH group of the first polymer or the like can be adjusted to be favorable.

Examples of the monomer having no OH group, which constitutes the first polymer, include acrylamide, N-methylacrylamide, N-isopropylacrylamide, N,N-dimethylacrylamide, N,N-dimethylaminopropylacrylamide, N,N-dimethylaminopropylacrylamide and quaternary salts thereof, acryloylmorpholine, N,N-dimethylaminoethylacrylate and quaternary salts thereof, acrylic acid, various alkyl acrylates, methacrylic acid, various alkyl methacrylates, N-vinylpyrrolidone, acrylonitrile, styrene, polyethylene glycol diacrylate, 1,6-hexanediol diacrylate, neopentyl glycol diacrylate, tripropylene glycol diacrylate, polypropylene glycol diacrylate, 2,2-bis[4-(acryloxydiethoxy)phenyl]propane, 2,2-bis[4-(acryloxypolyethoxy)phenyl]propane, 2,2-bis[4-(acryloxypolypropoxy)phenyl]propane, ethylene glycol dimethacrylate, diethylene glycol dimethacrylate, triethylene glycol dimethacrylate, polyethylene glycol dimethacrylate, 1,3-butylene glycol dimethacrylate, 1,6-hexanediol dimethacrylate, neopentyl glycol dimethacrylate, polypropylene glycol dimethacrylate, 2,2-bis[4-(methacryloxyethoxy)phenyl]propane, 2,2-bis[4-(methacryloxyethoxydiethoxy)phenyl]propane, 2,2-bis[4-(methacryloxyethoxypolyethoxy)phenyl]propane, trimethylolpropane trimethacrylate, tetramethylolmethane trimethacrylate, trimethylolpropane triacrylate, tetramethylolmethane triacrylate, tetramethylolmethane tetraacrylate, dipentaerythritol hexaacrylate, N,N'-methylenebisacrylamide, N,N'-methylenebismethacrylamide, diethylene glycol diallyl ether, divinylbenzene, ethylenebisacrylamide, N-[3-(dimethylamino)propyl]methacrylamide, N-isopropylacrylamide, diacetoneacrylamide, N-t-butylacrylamide, N,N-diethylacrylamide, N-isopropylmethacrylamide, N-(butoxymethyl)acrylamide, N-(isobutoxymethyl)acrylamide, N-phenylacrylamide, 4-acrylamidobenzo-18-crown-6 ether, acryloyl aminobenzocrown ether, methacryloyl aminobenzocrown ether, and 4-vinylbenzocrown ether, and one type or a combination of two or more types selected therefrom can be used.

The content of the monomer having no OH group in the first polymer is preferably 0.1 mol % or more and 40 mol % or less, more preferably 0.2 mol % or more and 30 mol % or less, further more preferably 0.3 mol % or more and 20 mol % or less.

The first polymer has a network structure (a crosslinked structure).

According to this, in the whole stimulus-responsive gel material, a state in which the first polymer and the second polymer are close to each other can be maintained stably, and thus, the detection of a stimulus intensity (the concentration of a predetermined component or the like) can be stably performed over a long period of time. Further, the ability to retain the solvent of the stimulus-responsive gel material can be particularly enhanced, and thus, a favorable gel state can be maintained stably over a long period of time.

Such a network structure (a crosslinked structure) can be favorably introduced by including a crosslinking agent component as a constituent component of the first polymer.

As the crosslinking agent component, a compound having two or more polymerizable functional groups can be used, and specific examples thereof include ethylene glycol, propylene glycol, trimethylolpropane, glycerin, polyoxyethylene glycol, polyoxypropylene glycol, polyglycerin, N,N'-methylenebisacrylamide, N,N-methylene-bis-N-vinylacetamide, N,N-butylene-bis-N-vinylacetamide, tolylene diisocyanate, hexamethylene diisocyanate, allylated starch, allylated cellulose, diallyl phthalate, tetraallyloxyethane, pentaerythritol triallyl ether, trimethylolpropane triallyl ether, diethylene glycol diallyl ether, and triallyl trimellitate, and one type or a combination of two or more types selected therefrom can be used.

The content of the crosslinking agent component in the first polymer is preferably 0.5 mol % or more and 7.0 mol % or less, more preferably 0.8 mol % or more and 6.0 mol % or less, further more preferably 1.1 mol % or more and 5.0 mol % or less.

According to this, the degree of crosslinking of the first polymer can be made to fall within a more favorable range, and while remarkably exhibiting the effect as described above, the flexibility of the first polymer can be made more appropriate.

The hydroxy value of the first polymer is preferably 15 mgKOH/g or more and 620 mgKOH/g or less, more preferably 34 mgKOH/g or more and 78 mgKOH/g or less.

According to this, while more remarkably exhibiting the effect of the first polymer because of having an OH group as described above, the durability of the stimulus-responsive gel material can be particularly enhanced.

On the other hand, if the hydroxy value of the first polymer is less than the above lower limit, the effect of the first polymer because of having an OH group as described above may not be sufficiently obtained depending on the ratio of the phenylboronic acid structure of the second polymer or the like.

If the hydroxy value of the first polymer exceeds the above upper limit, the durability of the stimulus-responsive gel material is lowered.

Incidentally, the first polymer does not have a phenylboronic acid structure.

The content $X_1$ of the first polymer in the stimulus-responsive gel material is preferably 0.05 mass % or more and 98 mass % or less, more preferably 0.1 mass % or more and 70 mass % or less.

According to this, particularly high sensitivity and quantitative performance for lactic acid are achieved, and also the ability to retain the solvent of the stimulus-responsive gel material can be particularly enhanced, and thus, a favorable gel state can be maintained stably over a long period of time.

The content of the first polymer in the polymeric material is preferably 1.0 mass % or more and 99 mass % or less, more preferably 1.5 mass % or more and 98 mass % or less.

According to this, particularly high sensitivity and quantitative performance for lactic acid are achieved, and also the ability to retain the solvent of the stimulus-responsive gel material can be particularly enhanced, and thus, a favorable gel state can be maintained stably over a long period of time.

Second Polymer

The second polymer has a phenylboronic acid structure.

By including such a second polymer along with the above-described first polymer, the detection of a stimulus intensity (the concentration of a predetermined component or the like) can be easily and stably performed in a wide range. In particular, the stimulus-responsive gel material is used for the detection and quantitative determination of lactic acid, high sensitivity in a low concentration range (for example, in a range of 0.4 mass % or less) can be achieved.

The phenylboronic acid structure may be introduced after a polymerizable compound (a monomer or the like) as a constituent component of the polymer is polymerized, however, it is preferred that the polymerizable compound serving as a constituent component of the polymer has the phenylboronic acid structure.

According to this, the ratio of the phenylboronic acid structure of the second polymer or the like can be easily and reliably adjusted.

Examples of the monomer having a phenylboronic acid structure, which constitutes the second polymer, include 3-acrylamidephenylboronic acid, vinylphenylboronic acid, acryloyloxyphenylboronic acid, acryloylaminobenzeneboronic acid, methacryloylaminobenzeneboronic acid, and 4-vinylbenzeneboronic acid, and one type or a combination of two or more types selected therefrom can be used. However, the second polymer preferably contains 3-acrylamidephenylboronic acid as a constituent component.

According to this, the conversion between the first state and the second state in accordance with a change in the environment where the stimulus-responsive gel material is placed (particularly, a change in the concentration of lactic acid) is more favorably achieved, and the detection and quantitative determination of a stimulus intensity (particularly, the concentration of lactic acid) can be more stably performed in a wider range. Further, the ability to retain the solvent of the stimulus-responsive gel material can be particularly enhanced, and thus, a favorable gel state can be maintained stably over a long period of time.

The content of the monomer having a phenylboronic acid structure in the second polymer is preferably 3.0 mol % or more and 98 mol % or less, more preferably 3.5 mol % or more and 70 mol % or less, further more preferably 3.8 mol % or more and 70 mol % or less.

According to this, the stimulus-responsive gel material has particularly excellent flexibility, and also has particularly high sensitivity and quantitative performance for a predetermined stimulus, and thus, the detection and quantitative determination of a stimulus intensity (particularly, the concentration of lactic acid) can be more stably performed in a wider range.

On the other hand, if the content of the monomer having a phenylboronic acid structure in the second polymer is less than the above lower limit, it may be difficult to obtain a sufficiently wide range (for example, the concentration of lactic acid) in which the detection and quantitative determination of a stimulus intensity (for example, the concentration of lactic acid) can be favorably performed depending on the ratio of the OH group of the first polymer or the like.

If the content of the monomer having a phenylboronic acid structure in the second polymer exceeds the above upper limit, the stimulus-responsive gel material becomes difficult to deform, and the sensitivity and quantitative performance for a predetermined stimulus is lowered.

This is considered to be because when the ratio of the phenylboronic acid structure is increased, a π electron interaction (π stacking) between benzene rings is strongly exhibited, and spaces into which the solvent or the like penetrates are decreased.

The second polymer may contain a monomer having no phenylboronic acid structure as a constituent component thereof. According to this, the ratio of the phenylboronic acid structure of the second polymer or the like can be adjusted to be favorable.

Examples of the monomer having no phenylboronic acid structure, which constitutes the second polymer, include acrylamide, N-methylacrylamide, N-isopropylacrylamide, N,N-dimethylacrylamide, N,N-dimethylaminopropylacrylamide, N,N-dimethylaminopropylacrylamide and quaternary salts thereof, acryloylmorpholine, N,N-dimethylaminoethylacrylate and quaternary salts thereof, acrylic acid, various alkyl acrylates, methacrylic acid, various alkyl methacrylates, N-vinylpyrrolidone, acrylonitrile, styrene, polyethylene glycol diacrylate, 1,6-hexanediol diacrylate, neopentyl glycol diacrylate, tripropylene glycol diacrylate, polypropylene glycol diacrylate, 2,2-bis[4-(acryloxydiethoxy)phenyl]propane, 2,2-bis[4-(acryloxypolyethoxy)phenyl]propane, 2,2-bis[4-(acryloxypolypropoxy)phenyl]propane, ethylene glycol dimethacrylate, diethylene glycol dimethacrylate, triethylene glycol dimethacrylate, polyethylene glycol dimethacrylate, 1,3-butylene glycol dimethacrylate, 1,6-hexanediol dimethacrylate, neopentyl glycol dimethacrylate, polypropylene glycol dimethacrylate, 2,2-bis[4-(methacryloxyethoxy)phenyl]propane, 2,2-bis[4-(methacryloxyethoxydiethoxy)phenyl]propane, 2,2-bis[4-(methacryloxyethoxypolyethoxy)phenyl]propane, trimethylolpropane trimethacrylate, tetramethylolmethane trimethacrylate, trimethylolpropane triacrylate, tetramethylolmethane triacrylate, tetramethylolmethane tetraacrylate, dipentaerythritol hexaacrylate, N,N'-methylenebisacrylamide, N,N'-methylenebismethacrylamide, diethylene glycol diallyl ether, divinylbenzene, ethylenebisacrylamide, N-[3-(dimethylamino)propyl]methacrylamide, N-isopropylacrylamide, diacetoneacrylamide, N-t-butylacrylamide, N,N-diethylacrylamide, N-isopropylmethacrylamide, N-(butoxymethyl)acrylamide, N-(isobutoxymethyl)acrylamide, N-phenylacrylamide, N-hydroxyethylacrylamide, 2-hydroxyethylmethacrylate, glycerol monomethacrylate, 2-hydroxy-1-acryloxy-3-methacryloxypropane, 2-hydroxy-1,3-dimethacryloxypropane, 4-acrylamidobenzo-18-crown-6 ether, acryloylaminobenzocrown ether, methacryloyl aminobenzocrown ether, and 4-vinylbenzocrown ether, and one type or a combination of two or more types selected therefrom can be used. However, the second polymer preferably contains N-hydroxyethylacrylamide as a constituent component.

According to this, the first polymer and the second polymer can be made to have a more favorable affinity for each other, and thus, a problem of undesired phase separation or the like in the stimulus-responsive gel material can be more reliably prevented over a longer period of time, and the durability and reliability of the stimulus-responsive gel material can be particularly enhanced. Further, the ability to retain the solvent of the stimulus-responsive gel material can be particularly enhanced.

The content of the monomer having no phenylboronic acid structure in the second polymer is preferably 1.0 mol % or more and 96 mol % or less, more preferably 5.0 mol % or more and 95 mol % or less, further more preferably 20 mol % or more and 93 mol % or less.

The second polymer may have a network structure (a crosslinked structure).

According to this, in a state where the second polymer penetrates into the network of the first polymer, the second polymer is more reliably prevented from falling out of the network of the first polymer over a longer period of time. This is because a closed ring structure of the first polymer and a closed ring structure of the second polymer have a relationship like adjacent rings forming a chain due to the network structure (which is a rigid structure formed by a covalent bond) of the second polymer.

As a result, a state in which the first polymer and the second polymer are close to each other can be maintained stably, and thus, the detection of a stimulus intensity (the concentration of a predetermined component or the like) can be stably performed over a long period of time.

Further, the ability to retain the solvent of the stimulus-responsive gel material can be particularly enhanced, and thus, a favorable gel state can be maintained stably over a long period of time.

Such a network structure (a crosslinked structure) can be favorably introduced by including a crosslinking agent component as a constituent component of the second polymer.

As the crosslinking agent component, a compound having two or more polymerizable functional groups can be used, and specific examples thereof include ethylene glycol, propylene glycol, trimethylolpropane, glycerin, polyoxyethylene glycol, polyoxypropylene glycol, polyglycerin, N,N'-methylenebisacrylamide, N,N-methylene-bis-N-vinylacetamide, N,N-butylene-bis-N-vinylacetamide, tolylene diisocyanate, hexamethylene diisocyanate, allylated starch, allylated cellulose, diallyl phthalate, tetraallyloxyethane, pentaerythritol triallyl ether, trimethylolpropane triallyl ether, diethylene glycol diallyl ether, and triallyl trimellitate, and one type or a combination of two or more types selected therefrom can be used.

The content of the crosslinking agent component in the second polymer is preferably 0.5 mol % or more and 10.0 mol % or less, more preferably 0.8 mol % or more and 8.0 mol % or less, further more preferably 1.1 mol % or more and 6.0 mol % or less.

According to this, the degree of crosslinking of the second polymer can be made to fall within a more favorable range, and while remarkably exhibiting the effect as described above, the flexibility of the second polymer can be made more appropriate.

The content $X_2$ of the second polymer in the stimulus-responsive gel material is preferably 0.01 mass % or more and 70 mass % or less, more preferably 0.05 mass % or more and 65 mass % or less.

According to this, the stimulus-responsive gel material has particularly excellent flexibility, and also has particularly high sensitivity and quantitative performance for a predetermined stimulus, and thus, the detection and quantitative determination of a stimulus intensity (particularly, the concentration of lactic acid) can be more stably performed in a wider range.

On the other hand, if the content $X_2$ of the second polymer in the stimulus-responsive gel material is less than the above lower limit, it may be difficult to obtain a sufficiently wide range (for example, the concentration of lactic acid) in which the detection and quantitative determination of a stimulus intensity (for example, the concentration of lactic acid) can be favorably performed depending on the ratio of the OH group of the first polymer or the like.

If the content $X_2$ of the second polymer in the stimulus-responsive gel material exceeds the above upper limit, the stimulus-responsive gel material becomes difficult to deform, and the sensitivity and quantitative performance for a predetermined stimulus is lowered.

The content of the second polymer in the polymeric material is preferably 1.0 mass % or more and 70 mass % or less, more preferably 2.0 mass % or more and 65 mass % or less.

According to this, the stimulus-responsive gel material has particularly excellent flexibility, and also has particularly high sensitivity and quantitative performance for a predetermined stimulus, and thus, the detection and quantitative determination of a stimulus intensity (particularly, the concentration of lactic acid) can be more stably performed in a wider range.

On the other hand, if the content of the second polymer in the polymeric material is less than the above lower limit, it may be difficult to obtain a sufficiently wide range (for example, the concentration of lactic acid) in which the detection and quantitative determination of a stimulus intensity (for example, the concentration of lactic acid) can be favorably performed depending on the ratio of the OH group of the first polymer or the like.

If the content of the second polymer in the polymeric material exceeds the above upper limit, the stimulus-responsive gel material becomes difficult to deform, and the sensitivity and quantitative performance for a predetermined stimulus is lowered.

When the content of the first polymer in the stimulus-responsive gel material is denoted by $X_1$ (mass %) and the content of the second polymer therein is denoted by $X_2$ (mass %), $X_1$ and $X_2$ preferably satisfy the following relationship: $0.2 \leq X_2/X_1 \leq 8$, and more preferably satisfy the following relationship: $1.3 \leq X_2/X_1 \leq 1.9$.

According to this, the stimulus-responsive gel material has particularly excellent flexibility, and also has particularly high sensitivity and quantitative performance for a predetermined stimulus, and thus, the detection and quantitative determination of a stimulus intensity (particularly, the concentration of lactic acid) can be more stably performed in a wider range.

On the other hand, if the value of $X_2/X_1$ is less than the above lower limit, it may be difficult to obtain a sufficiently wide range (for example, the concentration of lactic acid) in which the detection and quantitative determination of a stimulus intensity (for example, the concentration of lactic acid) can be favorably performed.

If the value of $X_2/X_1$ exceeds the above upper limit, the stimulus-responsive gel material becomes difficult to deform, and the sensitivity and quantitative performance for a predetermined stimulus is lowered.

The polymeric material constituting the stimulus-responsive gel material may include a polymer other than the first polymer and the second polymer as described above.

The content of the polymeric material in the stimulus-responsive gel material is preferably 0.7 mass % or more and 70.0 mass % or less, more preferably 2.4 mass % or more and 65.0 mass % or less.

According to this, the stimulus-responsive gel material is made particularly easy to handle, and also has particularly high sensitivity and quantitative performance for lactic acid.

Solvent

The stimulus-responsive gel material includes a solvent.

According to this, the above-described polymeric material can be gelled.

As the solvent, any of a variety of organic solvents and inorganic solvents can be used. Specific examples thereof include water; a variety of alcohols such as methanol and ethanol; ketones such as acetone; ethers such as tetrahydrofuran and diethyl ether; amides such as dimethylformamide; chain aliphatic hydrocarbons such as n-pentane, n-hexane, n-heptane, and n-octane; alicyclic hydrocarbons such as cyclohexane and methylcyclohexane; and aromatic hydrocarbons such as benzene, toluene, and xylene, and one type or a combination of two or more types selected therefrom can be used. However, in particular, a solvent containing water is preferred.

According to this, the detection and quantitative determination of the concentration of lactic acid can be performed in a wider concentration range, and also the solvent is more favorably retained in the stimulus-responsive gel material, and thus, the stability and reliability of the stimulus-responsive gel material can be particularly enhanced.

The content of the solvent (the solvent which can form a hydrogen bond) in the stimulus-responsive gel material is preferably 30 mass % or more and 98 mass % or less, more preferably 50 mass % or more and 95 mass % or less.

According to this, the stimulus-responsive gel material is made particularly easy to handle, and also has particularly high sensitivity and quantitative performance for lactic acid.

Fine Particles

The stimulus-responsive gel material includes fine particles having an average particle diameter of 10 nm or more and 1000 nm or less.

According to this, when the stimulus-responsive gel material receives a stimulus of a change in the concentration of lactic acid, a change in the structural color of colloidal crystals formed by the fine particles is easily recognized, and therefore, the detection and quantitative determination of the concentration of lactic acid can be easily and reliably performed.

By including the fine particles in the stimulus-responsive gel material, the wavelength of a reflected light from the stimulus-responsive gel material largely changes according to the concentration of lactic acid with which the stimulus-responsive gel material comes in contact, and thus, the quantitative performance for the concentration of lactic acid can be enhanced.

In this embodiment, the average particle diameter refers to an average particle diameter on the volume basis, and can be obtained by, for example, measurement with a particle size distribution analyzer employing a Coulter counter method (model: TA-II, manufactured by Coulter Electronics, Inc.) using an aperture of 50 μm for a dispersion obtained by adding a sample to methanol and dispersing therein for 3 minutes with an ultrasonic disperser.

Examples of the constituent material of the fine particles include inorganic materials such as silica and titanium oxide; and organic materials (polymers) such as polystyrene, polyester, polyimide, polyolefin, poly(methyl (meth)acrylate), polyethylene, polypropylene, polyether sulfone, nylon, polyurethane, polyvinyl chloride, and polyvinylidene chloride, however, the fine particles are preferably silica fine particles.

According to this, the fine particles have particularly excellent shape stability and the like, and thus, the durability, reliability, and the like of the stimulus-responsive gel material can be particularly enhanced. Silica fine particles are relatively easily available as those having a sharp particle size distribution (monodisperse fine particles), and therefore are advantageous also from the viewpoint of stable production and supply of the stimulus-responsive gel material.

The shape of the fine particles is not particularly limited, but is preferably a spherical shape. According to this, the structural color due to colloidal crystals is more reliably visually recognized, and the quantitative determination of the concentration of lactic acid can be more easily and more reliably performed.

The average particle diameter of the fine particles may be 10 nm or more and 1000 nm or less, but is preferably 20 nm or more and 500 nm or less.

According to this, the effect of including the fine particles in the stimulus-responsive gel material as described above is more remarkably exhibited.

The stimulus-responsive gel material may include a plurality of different types of fine particles.

The content of the fine particles in the stimulus-responsive gel material is preferably 1.6 mass % or more and 36 mass % or less, more preferably 4.0 mass % or more and 24 mass % or less.

According to this, the effect of including the fine particles in the stimulus-responsive gel material as described above is more remarkably exhibited.

Other Components

The stimulus-responsive gel material may include components other than the above-described components (other components).

Examples of such components include a colorant, a slipping agent (a leveling agent), an antifungal agent, a preservative, an antioxidant, a solvent which does not form a hydrogen bond, and a moisturizing agent.

Shape of Whole Stimulus-Responsive Gel Material

The shape of the stimulus-responsive gel material may be any, and examples thereof include a sheet, (a film), a plate, a block, a string, a tube, and a particle.

Application, Etc. of Stimulus-Responsive Gel Material

The stimulus-responsive gel material is capable of easily and stably detecting a stimulus intensity (the concentration of a predetermined component or the like) in a wide range, and has excellent quantitative performance, and therefore can be used as, for example, a sensor (a detection unit) for determining whether or not a specific substance is contained in a specimen or determining the concentration of a specific substance contained in a specimen.

The amount of a specific component incorporated in the stimulus-responsive gel material can be stably identified, and therefore, the stimulus-responsive gel material can also be favorably used as a separation and extraction unit for separating and extracting a specific substance contained in a test subject. That is, at a stage where the amount of a specific component incorporated in the stimulus-responsive gel material is saturated or almost saturated, the contact thereof with a contact liquid is stopped, and according to need, it can be replaced by another stimulus-responsive gel material. According to this, the specific component can be collected from the contact liquid without waste.

Examples of the application field of the stimulus-responsive gel material include a health exercise field, a medical field, a food field, and a pharmaceutical field.

More specific application of the stimulus-responsive gel material include detection units for biological substances (for example, various types of cells such as cancer cells and blood cells, proteins such as antibodies (including glycoproteins and the like), etc.), detection units for components (for example, lactic acid, uric acid, sugar, etc.) contained in body fluids or substances secreted outside the body (for example, blood, saliva, sweat, urine, etc.), separation and extraction units for biological substances (particularly, trace biological substances and the like such as hormones), separation and extraction units for metals (particularly, rare metals, noble metals, etc.), detection units for antigens such as pollens (allergic substances), separation and extraction units for poisons, toxic substances, environmental pollutants, etc., detection units for viruses, bacteria, etc., detection units for components contained in soils, detection units for components contained in waste fluids (including drained water), detection units for components contained in foods, detection units for components contained in water (for example, salts and the like contained in brackish waters, rivers, paddies, etc.), materials for drug delivery targeting specific tissues, components, etc. (for example, cancer tissues, etc.), bioreactor monitors, and cell culture monitors.

In the case where the stimulus-responsive gel material is configured to detect lactic acid as a predetermined stimulus, for example, it can be applied to a blood lactic acid sensor, a sensor for rapid detection of an increase in the concentration of lactic acid in the blood or tissues in acute deterioration in patients, a sensor for early detection of arteriosclerosis obliterans, decubitus ulcer, or the like, and a sensor for detection of the concentration of lactic acid in foods (for example, for testing of the degree of fermentation of fermented foods, for controlling of food quality, etc.).

Method for Producing Stimulus-Responsive Gel Material

Next, a method for producing a stimulus-responsive gel material will be described.

The production method of this embodiment includes a first polymerization step (1a) in which a polymerization reaction is performed using a first composition containing a first monomer, a crosslinking agent, and fine particles having an average particle diameter of 10 nm or more and 1000 nm or less to synthesize a first polymer containing the first monomer and the crosslinking agent as constituent components, including an OH group, and having a network structure, whereby a first gel material in which the first polymer and the fine particles are mixed with each other is obtained, and a second polymerization step (1b) in which a second composition containing a second monomer is polymerized in the presence of the first gel material, whereby a second polymer is obtained.

According to this, a stimulus-responsive gel material capable of easily and stably detecting a stimulus intensity (the concentration of a predetermined component or the like) in a wide range can be efficiently produced.

First Polymerization Step

First, a first polymer is synthesized using a first composition whereby a first gel material is obtained (1a).

The first composition contains a first monomer, a crosslinking agent, and fine particles having an average particle diameter of 10 nm or more and 1000 nm or less.

As the first monomer, for example, the "monomer having an OH group" described as the constituent component of the first polymer can be used.

As the crosslinking agent and the fine particles, those satisfying the same conditions as described above as the constituent components of the stimulus-responsive gel material can be favorably used.

The first composition preferably contains a polymerization initiator.

According to this, in this step, the polymerization reaction can be favorably initiated and allowed to proceed.

The polymerization initiator can be appropriately selected according to, for example, the polymerization method thereof. Specific examples thereof include compounds which generate radicals by ultraviolet light including hydrogen peroxide, persulfates such as potassium persulfate, sodium persulfate, and ammonium persulfate, azo-based initiators such as 2,2'-azobis(2-amidinopropane) dihydrochloride, 2,2'-azobis(N,N'-dimethyleneisobutylamidine) dihydrochloride, 2,2'-azobis{2-methyl-N-[1,1-bis(hydroxymethyl)-2-hydroxyethyl]propionamide}, 2,2'-azobis[2-(2-imidazolin-2-yl)propane]dihydrochloride, 4,4'-azobis(4-cyanovaleric acid), 2,2'-azobisisobutyronitrile, 2,2'-azobis(2,4'-dimethylvaleronitrile), benzophenone, 2,2-dimethoxy-1,2-diphenylethan-1-one, 1-hydroxycyclohexyl phenyl ketone, 2-hydroxy-2-methyl-1-phenylpropan-1-one, 2,4,6-trimethylbenzoyl diphenylphosphine oxide, 1-[4-(2-hydroxyethoxy)-phenyl]2-hydroxy-2-methyl-1-propan-1-one, and the like, and compounds which generate radicals by light with a wavelength of 360 nm or more such as substances obtained by mixing a thiopyrylium salt-based, merocyanine-based, quinolone-based, or styrylquinoline-based dye with 2,4-diethyl thioxanthone, isopropyl thioxanthone, 1-chloro-4-propoxythioxanthone, 2-(3-dimethylamino-2-hydroxypropoxy)-3,4-dimethyl-9H-thioxanthon-9-one mesochloride, 2-methyl-1-[4-(methylthio)phenyl]-2-morpholinopropane-1,2-benzyl-2-dimethylamino-1-(4-morpholinophenyl)-butanone-1, bis(cyclopentadienyl)-bis(2,6-difluoro-3-(pyl-1-yl) titanium, or a peroxy ester such as 1,3-di(t-butylperoxycarbonyl)benzene or 3,3',4,4'-tetra-(t-butylperoxycarbonyl)benzophenone. Hydrogen peroxide or a persulfate can also be used as a redox-based initiator in combination with, for example, a reducing substance such as a sulfite or L-ascorbic acid, an amine salt, or the like.

The first composition preferably contains a solvent having a function of dissolving or dispersing other components.

By including the solvent, the polymerization reaction can be more favorably initiated and allowed to proceed. In addition, the respective constituent components can be made to exist more uniformly at each site in the first composition, and an undesired compositional variation or the like in the finally obtained stimulus-responsive gel material can be effectively prevented. Further, when the polymer is synthesized by the polymerization reaction, the reaction product can be favorably gelled, and therefore, as compared with the case where gelling is performed after the polymerization reaction, the productivity of the stimulus-responsive gel material can be enhanced. In addition, as compared with the case where gelling is performed by mixing the polymer with the solvent after the polymer is synthesized by the polymerization reaction, an undesired compositional variation at each site of the stimulus-responsive gel material can be effectively prevented from occurring.

As the solvent, any of a variety of organic solvents and inorganic solvents can be used. Specific examples thereof include water; a variety of alcohols such as methanol and ethanol; ketones such as acetone; ethers such as tetrahydrofuran and diethyl ether; amides such as dimethylformamide; chain aliphatic hydrocarbons such as n-pentane, n-hexane, n-heptane, and n-octane; alicyclic hydrocarbons such as cyclohexane and methylcyclohexane; and aromatic hydrocarbons such as benzene, toluene, and xylene, and one type or a combination of two or more types selected therefrom can be used. However, in particular, a solvent containing water is preferred.

According to this, the polymerization reaction can be favorably initiated and allowed to proceed, and the properties of the finally obtained stimulus-responsive gel material can be particularly enhanced. Water can be favorably used as a constituent component of the final stimulus-responsive gel material, and therefore, a purification process after the polymerization reaction can be omitted or simplified. In particular, the effect that the polymerization reaction is efficiently initiated and allowed to proceed and the effect that a purification process can be omitted or simplified synergistically interact with each other, and thus, the productivity of the stimulus-responsive gel material can be particularly enhanced.

The first composition may contain components other than the above-described components (other components).

Examples of such components include a colorant, a slipping agent (a leveling agent), an antifungal agent, a preservative, and an antioxidant.

Second Polymerization Step

Thereafter, a second composition containing a second monomer is polymerized in the presence of the first gel material, whereby a second polymer is obtained (1b). According to this, a stimulus-responsive gel material having a structure in which a polymer chain of the second polymer penetrates into the network of the first polymer contained in the first gel material is obtained.

The second composition contains a second monomer.

As the second monomer, for example, the "monomer having a phenylboronic acid structure" described as the constituent component of the second polymer can be used.

By using a monomer having a phenylboronic acid structure as the second monomer, the effect as described below is obtained. That is, as described above, the OH group of the first polymer and the phenylboronic acid structure have a high affinity for each other. Due to this, in this step, by using a monomer having a phenylboronic acid structure as the second monomer, before the polymerization reaction is initiated, a state in which the second monomer comes close to the OH group of the first polymer, particularly, a state in which the second monomer penetrates into the network of the first polymer can be easily and reliably reached. Therefore, a state in which the second polymer obtained by the polymerization reaction penetrates into the network of the first polymer can be easily and reliably reached.

The second composition may contain at least the second monomer, but preferably further contains a crosslinking agent.

According to this, the second polymer having a network structure (a crosslinked structure) can be efficiently synthesized.

By synthesizing the second polymer as a polymer having a network structure (a crosslinked structure), in a state in which the second polymer penetrates into the network of the first polymer, the second polymer is more reliably prevented from falling out of the network of the first polymer over a longer period of time. As a result, a state in which the first polymer and the second polymer are close to each other can be maintained stably, and thus, the detection of a stimulus intensity (the concentration of a predetermined component or the like) can be stably performed over a long period of time.

Further, the ability to retain the solvent of the stimulus-responsive gel material can be particularly enhanced, and thus, a favorable gel state can be maintained stably over a long period of time.

The second composition preferably contains a polymerization initiator.

According to this, in this step, the polymerization reaction can be favorably initiated and allowed to proceed.

As the polymerization initiator, for example, the polymerization initiator described as the constituent component of the first composition can be used. The polymerization initiator to be contained in the second composition and the polymerization initiator to be contained in the first composition may be the same as or different from each other.

The second composition preferably contains a solvent having a function of dissolving or dispersing other components.

By including such a solvent in the second composition, the polymerization reaction can be more favorably initiated and allowed to proceed. In addition, the respective constituent components can be made to exist more uniformly at each site in the second composition which coexists with the first gel material, and an undesired compositional variation or the like in the obtained stimulus-responsive gel material can be effectively prevented. Further, when the polymer is synthesized by the polymerization reaction, the reaction product can be favorably gelled, and therefore, as compared with the case where gelling is performed after the polymerization reaction, the productivity of the stimulus-responsive gel material can be enhanced. In addition, as compared with the case where gelling is performed by mixing the polymer with the solvent after the polymer is synthesized by the polymerization reaction, an undesired compositional variation at each site of the stimulus-responsive gel material can be effectively prevented from occurring.

As the solvent, the solvent described as the constituent component of the first composition can be used. The solvent to be contained in the second composition and the solvent to be contained in the first composition may be the same as or different from each other.

The second composition may contain components other than the above-described components (other components).

Examples of such components include a colorant, a slipping agent (a leveling agent), an antifungal agent, a preservative, and an antioxidant.

Hereinabove, preferred embodiments are described, however, the invention is not limited thereto.

For example, the method for producing a stimulus-responsive gel material may include at least the first polymerization step and the second polymerization step, and according to need, a pretreatment step, an intermediate treatment step, or a post-treatment step may also be performed.

For example, after the first polymerization step or after the second polymerization step, a step of adjusting the amount of the solvent in the gel material, or a step of replacing at least a portion of the solvent may be included.

The stimulus-responsive gel material is not limited to those produced by the method described above.

EXAMPLES

Hereinafter, a more detailed description will be made with reference to Examples, however, the invention is not limited only to these Examples.

(1) Production of Stimulus-Responsive Gel Material

Example 1

In a container, a 10 mass % aqueous solution of N-hydroxyethylacrylamide (0.8 mL) as the monomer having an OH group, a 2 mass % aqueous solution of N,N'-methylenebisacrylamide (0.2 mL) as the crosslinking agent, and a 5 mass % aqueous solution of a compound represented by the following formula (1) (0.2 mL) as the polymerization initiator were mixed, and further, an aqueous dispersion of silica nanoparticles having a silica concentration of 40% (0.35 mL) was added in small portions thereto, followed by stirring, whereby a first mixed liquid was obtained.

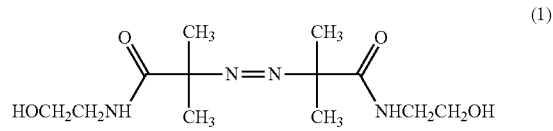

Subsequently, to the first mixed liquid, an ion exchange resin (half the volume of the mixed liquid) was added, and the resulting mixture was stirred well until a structural color appeared.

Subsequently, the first mixed liquid in which the structural color appeared was separated from the ion exchange resin by collecting only the first mixed liquid with a micropipette and placed in another container (a container with a septum cap).

Thereafter, a degassing treatment was performed by nitrogen bubbling. The degassing time was set to 300 seconds, and the nitrogen gas flow rate was set to 10 mL/min.

On the other hand, a glass plate with a size of 18 mm×18 mm (a first glass substrate) subjected to a washing treatment, and thereafter further subjected to a silane coupling treatment was prepared. To this first glass substrate, a spacer with a thickness of 0.1 mm was attached, and further, a second glass substrate (20 mm×20 mm) which is larger than the first glass substrate was also attached thereto with the spacer interposed therebetween, whereby a cell was prepared.

Subsequently, the cell was placed in a transparent container (a glass container) with a septum cap, and the container was filled with nitrogen gas.

Subsequently, the first mixed liquid in which the structural color appeared was aspirated using a syringe with a needle and injected into the cell through the septum cap with the needle.

Thereafter, the needle was pulled out from the septum cap, and the cap was further sealed with Parafilm.

Subsequently, the cell in the transparent container was irradiated with ultraviolet light (peak wavelength: 365 nm, SP-7, manufactured by Ushio, Inc.) to cause a polymerization reaction of the first mixed liquid, whereby a first polymer was synthesized.

Thereafter, the cell was taken out from the transparent container and immersed in pure water. In water, the second glass substrate was peeled off from the first glass substrate, whereby a film-shaped gel material (a first gel material containing the first polymer, the solvent, and the fine particles) was obtained.

The thus obtained first gel material was immersed in pure water for 24 hours, and thereafter taken out from pure water and then immersed in ethanol.

Thereafter, the first gel material was taken out from ethanol, and excess ethanol was removed. Then, the first gel material was placed in a transparent container (a glass container) with a septum cap, and the container was filled with nitrogen gas with the surface of the first gel material kept facing up.

Subsequently, a 40 mass % ethanol solution of 3-acrylamidephenylboronic acid as the monomer having a phenylboronic acid structure (0.01 mL), a 10 mass % ethanol solution of N-hydroxyethylacrylamide (0.04 mL), a 2 mass % ethanol solution of N,N'-methylenebisacrylamide (0.02 mL) as the crosslinking agent, and a 5 mass % ethanol solution of a compound represented by the above formula (1) (0.01 mL) as the polymerization initiator were mixed, whereby a second mixed liquid was prepared. The second mixed liquid was placed in a container with a septum cap and subjected to a degassing treatment by nitrogen bubbling. The degassing time was set to 300 seconds, and the nitrogen gas flow rate was set to 10 mL/min.

The second mixed liquid (a mixed liquid containing 3-acrylamidephenylboronic acid) subjected to the degassing treatment was aspirated using a syringe with a needle, and the total amount of the aspirated second mixed liquid was dropped on the first gel material through the septum cap with the needle.

After standing for 30 minutes, the excess second mixed liquid around the first gel material was removed.

Subsequently, the transparent container (the glass container) with a septum cap in which the first gel material and the second mixed liquid were placed was irradiated with ultraviolet light (peak wavelength: 365 nm, SP-7, manufactured by Ushio, Inc.) to cause a polymerization reaction of the second mixed liquid, whereby a second polymer was synthesized. By doing this, a stimulus-responsive gel material including the first polymer, the second polymer, the solvent, and the fine particles was obtained.

In the above description, the procedures in which the temperature was not particularly specified were performed at room temperature (25° C.).

Examples 2 to 10

Stimulus-responsive gel materials were produced in the same manner as in the above-described Example 1 except that the types and amounts of the components to be used for preparing the first mixed liquid and the second mixed liquid were changed.

Comparative Example 1

A stimulus-responsive gel material was produced in the same manner as in the above-described Example 1 except that the first gel material was directly used as a stimulus-responsive gel material without using the second mixed liquid. That is, in this Comparative Example, a stimulus-responsive gel material was produced as a material which does not include the second polymer.

Comparative Example 2

In a container, a 40 mass % ethanol solution of 3-acrylamidephenylboronic acid as the monomer having a phenylboronic acid structure (0.01 mL), a 10 mass % ethanol solution of N-hydroxyethylacrylamide (0.04 mL), a 2 mass % ethanol solution of N,N'-methylenebisacrylamide (0.02 mL) as the crosslinking agent, and a 5 mass % ethanol solution of a compound represented by the above formula (1) (0.01 mL) as the polymerization initiator were mixed, and further, an aqueous dispersion of silica nanoparticles having a silica concentration of 40% (0.35 mL) was added in small portions thereto, followed by stirring, whereby a mixed liquid was obtained.

Subsequently, to the mixed liquid, an ion exchange resin (half the volume of the mixed liquid) was added, and the resulting mixture was stirred well until a structural color appeared.

Subsequently, the mixed liquid in which the structural color appeared was separated from the ion exchange resin by collecting only the mixed liquid with a micropipette and placed in another container (a container with a septum cap).

Thereafter, a degassing treatment was performed by nitrogen bubbling. The degassing time was set to 300 seconds, and the nitrogen gas flow rate was set to 10 mL/min.

On the other hand, a glass plate with a size of 18 mm×18 mm (a first glass substrate) subjected to a washing treatment, and thereafter further subjected to a silane coupling treatment was prepared. To this first glass substrate, a spacer with a thickness of 0.1 mm was attached, and further, a second glass substrate (20 mm×20 mm) which is larger than the first glass substrate was also attached thereto with the spacer interposed therebetween, whereby a cell was prepared.

Subsequently, the cell was placed in a transparent container (a glass container) with a septum cap, and the container was filled with nitrogen gas.

Subsequently, the mixed liquid in which the structural color appeared was aspirated using a syringe with a needle and injected into the cell through the septum cap with the needle.

Thereafter, the needle was pulled out from the septum cap, and the cap was further sealed with Parafilm.

Subsequently, the cell in the transparent container was irradiated with ultraviolet light (peak wavelength: 365 nm, SP-7, manufactured by Ushio, Inc.) to cause a polymerization reaction of the mixed liquid, whereby a first polymer was synthesized.

Thereafter, the cell was taken out from the transparent container and immersed in pure water. In water, the second glass substrate was peeled off from the first glass substrate, whereby a film-shaped stimulus-responsive gel material was obtained.

That is, in this Comparative Example, the stimulus-responsive gel material was produced as a material which does not include the first polymer.

Comparative Example 3

In a container, a 10 mass % aqueous solution of N-hydroxyethylacrylamide (0.8 mL) as the monomer having an OH group, a 40 mass % ethanol solution of 3-acrylamidephenylboronic acid as the monomer having a phenylboronic acid structure (0.01 mL), a 10 mass % ethanol solution of N-hydroxyethylacrylamide (0.04 mL), a 2 mass % ethanol solution of N,N'-methylenebisacrylamide (0.22 mL) as the crosslinking agent, and a 5 mass % ethanol solution of a compound represented by the above formula (1) (0.21 mL) as the polymerization initiator were mixed, and further, an aqueous dispersion of silica nanoparticles having a silica concentration of 40% (0.39 mL) was added in small portions thereto, followed by stirring, whereby a mixed liquid was obtained.

Subsequently, to the mixed liquid, an ion exchange resin (half the volume of the mixed liquid) was added, and the resulting mixture was stirred well until a structural color appeared.

Subsequently, the mixed liquid in which the structural color appeared was separated from the ion exchange resin by collecting only the mixed liquid with a micropipette and placed in another container (a container with a septum cap).

Thereafter, a degassing treatment was performed by nitrogen bubbling. The degassing time was set to 300 seconds, and the nitrogen gas flow rate was set to 10 mL/min.

On the other hand, a glass plate with a size of 18 mm×18 mm (a first glass substrate) subjected to a washing treatment, and thereafter further subjected to a silane coupling treatment was prepared. To this first glass substrate, a spacer with a thickness of 0.1 mm was attached, and further, a second glass substrate (20 mm×20 mm) which is larger than the first glass substrate was also attached thereto with the spacer interposed therebetween, whereby a cell was prepared.

Subsequently, the cell was placed in a transparent container (a glass container) with a septum cap, and the container was filled with nitrogen gas.

Subsequently, the mixed liquid in which the structural color appeared was aspirated using a syringe with a needle and injected into the cell through the septum cap with the needle.

Thereafter, the needle was pulled out from the septum cap, and the cap was further sealed with Parafilm.

Subsequently, the cell in the transparent container was irradiated with ultraviolet light (peak wavelength: 365 nm, SP-7, manufactured by Ushio, Inc.) to cause a polymerization reaction of the mixed liquid, whereby a first polymer was synthesized.

Thereafter, the cell was taken out from the transparent container and immersed in pure water. In water, the second glass substrate was peeled off from the first glass substrate, whereby a film-shaped stimulus-responsive gel material was obtained.

That is, in this Comparative Example, the stimulus-responsive gel material was produced as a material in which although the first polymer and the second polymer are included, the second polymer does not penetrate into the network of the first polymer.

In the description of the above respective Examples and Comparative Examples, the procedures in which the temperature was not particularly specified were performed at room temperature (25° C.)

The configurations and the like of the stimulus-responsive gel materials of the above respective Examples and Comparative Examples are summarized in Table 1. In Table 1, N-hydroxyethylacrylamide as the monomer is denoted by "H1", 2-hydroxyethylmethacrylate as the monomer is denoted by "H2", N-hydroxymethylacrylamide as the monomer is denoted by "H3", N-tris(hydroxymethyl)methylacrylamide as the monomer is denoted by "H4", 3-acrylamidephenylboronic acid as the monomer is denoted by "B1", vinylphenylboronic acid as the monomer is denoted by "B2", and N,N'-methylenebisacrylamide as the crosslinking agent is denoted by "BA1".

When an observation was made for each of the stimulus-responsive gel materials of the above respective Examples using a microscope, phase separation between the first polymer and the second polymer was not observed, and it was confirmed that these polymers are microscopically integrated with each other. On the other hand, in the stimulus-responsive gel material of Comparative Example 3, significant phase separation between the first polymer and the second polymer was observed.

When the measurement of an endothermic peak at the melting point was performed by differential scanning calorimetry (DSC) with respect to the stimulus-responsive gel materials produced in the same manner as in the above respective Examples, the melting point peaks of the first polymer and the second polymer in an independent state were not observed, and a significant melting point peak was observed at a temperature different from the melting point peaks of the first polymer and the second polymer.

With respect to the stimulus-responsive gel materials produced in the same manner as in the above respective Examples, the following procedure was performed. Toluene as an organic solvent which dissolves only the first polymer and does not dissolve the second polymer (the solubility at 25° C. of the first polymer is 1 g/100 g or more, and the solubility at 25° C. of the second polymer is 0.01 g/100 g or less) was added to the stimulus-responsive gel material at 25° C. in an amount of 1000 g with respect to 10 g of the stimulus-responsive gel material. Further, the resulting mixture was sufficiently stirred at this temperature, followed by filtration using a Durapore membrane filter HVHP04700 (manufactured by Millipore, Co., Ltd.) as a filter. Thereafter, the resulting residue was washed with the solvent so that the theoretical total amount of the extraction liquid (the total amount of the extraction liquid when assuming that the solvent does not volatilize during filtration) was 200 times (mass basis) as much as that of the stimulus-responsive gel material used. Then, the ratio (($W_2/W_1$)×100) of the amount ($W_2$ (g)) of a component soluble in the solvent of the first polymer and the second polymer contained in the extraction liquid to the contained amount ($W_1$ (g)) of a component soluble in the solvent of the first polymer and the second polymer contained in the stimulus-responsive gel material mixed with the solvent contained in the extraction liquid was calculated and found to be 1 mass % or less in all the cases. On the other hand, in the case of Comparative Example 3, the value of ($W_2/W_1$)×100 obtained as described above was 99 mass % or more.

Based on these results, it is found that in each of the stimulus-responsive gel materials of the above respective Examples, the second polymer penetrates into the network of the first polymer. On the other hand, it is found that in the stimulus-responsive gel material of Comparative Example, the second polymer does not penetrate into the network of the first polymer.

TABLE 1

| | Polymeric material | | | | | | | | | | | |
|---|---|---|---|---|---|---|---|---|---|---|---|---|
| | First polymer | | | | Second polymer | | | With or without penetration into network of first polymer | Fine particles | | Solvent | |
| | Constituent component | | | | Constituent component | | | | | | | |
| | Type | Blending ratio (molar ratio) | Hydroxy value (mgKOH/g) | Content (parts by mass) | Type | Blending ratio (molar ratio) | Content (parts by mass) | | Content (parts by mass) | Constituent material | Content (parts by mass) | Constituent component | Content (parts by mass) |
| Example 1 | H1/BA1 | 96.4/3.6 | 39.0 | 8.4 | B1/H1/BA1 | 48.2/48.2/3.6 | 12.0 | With | 8.6 | Silica | 11 | Water | 80.4 |
| Example 2 | H2/BA1 | 96.0/4.0 | 34.5 | 8.4 | B1/H1/BA1 | 48.2/48.2/3.6 | 12.0 | With | 8.6 | Silica | 11 | Water | 80.4 |
| Example 3 | H3/BA1 | 96.8/3.2 | 44.4 | 8.4 | B1/H1/BA1 | 48.2/48.2/3.6 | 12.0 | With | 8.6 | Silica | 11 | Water | 80.4 |
| Example 4 | H4/BA1 | 94.6/5.4 | 76.9 | 8.4 | B1/H1/BA1 | 65.0/32.5/2.4 | 15.5 | With | 8.9 | Silica | 11 | Water | 80.1 |
| Example 5 | H1/BA1 | 96.4/3.6 | 65.0 | 14 | B1/H1/BA1 | 73.6/24.5/1.8 | 18.2 | With | 14.3 | Silica | 11 | Water | 74.7 |
| Example 6 | H1/H4/BA1 | 58.4/38.4/3.3 | 105.3 | 15.1 | B1/H1/BA1 | 48.2/48.2/3.6 | 12.0 | With | 14.9 | Silica | 11 | Water | 74.1 |
| Example 7 | H2/H3/BA1 | 40.7/52.4/6.9 | 19.7 | 4.4 | B2/H1/BA1 | 42.0/54.0/4.0 | 12.0 | With | 4.9 | Silica | 11 | Water | 84.1 |
| Example 8 | H1/BA1 | 93.1/6.9 | 19.5 | 4.4 | B2/H1/BA1 | 59.2/38.0/2.8 | 15.5 | With | 5.2 | Silica | 11 | Water | 83.8 |
| Example 9 | H4/BA1 | 77.9/22.1 | 15.4 | 2.0 | B2/H1/BA1 | 59.2/38.0/2.8 | 15.5 | With | 3.0 | Silica | 11 | Water | 86.0 |
| Example 10 | H4/BA1 | 99.3/0.7 | 615.0 | 64.4 | B2/H1/BA1 | 68.5/29.3/2.2 | 18.2 | With | 60.6 | Silica | 11 | Water | 28.4 |
| Comparative Example 1 | H1/BA1 | 96.4/3.6 | 39.0 | 8.4 | — | — | — | Without | 8.4 | Silica | 11 | Water | 80.6 |
| Comparative Example 2 | — | — | — | — | B1/H1/BA1 | 48.2/48.2/3.6 | 12.0 | Without | 12.0 | Silica | 11 | Water | 77.0 |
| Comparative Example 3 | H1/BA1 | 96.4/3.6 | 39.0 | 8.4 | B1/H1/BA1 | 48.2/48.2/3.6 | 12.0 | Without | 8.6 | Silica | 11 | Water | 80.4 |

(2) Evaluation of Stimulus-Responsive Gel Material (2.1) Change in Reflection Spectrum of Gel Film with Respect to Change in Concentration of Lactic Acid In each of the above respective Examples and Comparative Examples, a film-shaped stimulus-responsive gel material (16 mm×16 mm) produced on the first glass substrate was immersed in pure water in a container.

Subsequently, after excess water of the stimulus-responsive gel material taken out from pure water was removed, the stimulus-responsive gel material was placed in a plastic container with a diameter of 6 cm filled with an aqueous solution of lactic acid for evaluation having a predetermined concentration, and immersed in the aqueous solution of lactic acid.

The stimulus-responsive gel material was left to stand in the aqueous solution of lactic acid for 5 minutes, and it was confirmed that the color of the stimulus-responsive gel material no longer changed and was stabilized.

Thereafter, with respect to the stimulus-responsive gel material whose color was stabilized, color measurement was performed on the side of the first glass substrate using SpectroEye manufactured by X-Rite Incorporated, and the data of the reflection spectrum of the stimulus-responsive gel material was obtained.

After the color measurement was completed, the stimulus-responsive gel material was transferred to a container filled with pure water and left to stand for 10 minutes, and it was confirmed that the color of the stimulus-responsive gel material no longer changed and was stabilized.

Thereafter, the stimulus-responsive gel material was taken out from pure water and immersed in an aqueous solution of lactic acid for evaluation whose concentration was changed. Then, the stimulus-responsive gel material was left to stand for 5 minutes, and it was confirmed that the color of the stimulus-responsive gel material no longer changed and was stabilized.

Thereafter, with respect to the stimulus-responsive gel material whose color was stabilized, color measurement was performed in the same manner as described above, and the data of the reflection spectrum of the stimulus-responsive gel material was obtained.

By repeating the procedure as described above, within a range in which the concentration of lactic acid is 0 mass % or more and 0.70 mass % or less, a graph showing the relationship between the concentration of lactic acid (X axis) and the peak wavelength of a reflected light from the stimulus-responsive gel material (Y axis) was created, and the width of the range of the concentration region in which the absolute value ($|\Delta Y/\Delta X|$) of the slope of the graph is 100 (nm/mass %) or more (hereinafter referred to as "the width of the region in which the sensitivity is a predetermined value or more") was obtained and evaluated according to the following criteria.

A: The width of the region in which the sensitivity is a predetermined value or more is 0.50 mass % or more.

B: The width of the region in which the sensitivity is a predetermined value or more is 0.30 mass % or more and less than 0.50 mass %.

C: The width of the region in which the sensitivity is a predetermined value or more is 0.20 mass % or more and less than 0.30 mass %.

D: The width of the region in which the sensitivity is a predetermined value or more is 0.15 mass % or more and less than 0.20 mass %.

E: The width of the region in which the sensitivity is a predetermined value or more is less than 0.15 mass %.

In the above description, the procedures in which the temperature was not particularly specified were performed at room temperature (25° C.), and also as pure water and the aqueous solutions of lactic acid for evaluation, those at 25° C. were used.

These results are summarized in Table 2.

TABLE 2

|  | Evaluation |
| --- | --- |
| Example 1 | A |
| Example 2 | A |
| Example 3 | A |
| Example 4 | A |
| Example 5 | A |
| Example 6 | B |
| Example 7 | B |
| Example 8 | B |
| Example 9 | B |
| Example 10 | B |
| Comparative Example 1 | E |
| Comparative Example 2 | E |
| Comparative Example 3 | E |

As apparent from Table 2, in the case of using the stimulus-responsive gel materials of Examples, the detection of the concentration of lactic acid (a predetermined stimulus) could be easily and stably performed in a wide concentration range. Further, each of the stimulus-responsive gel materials of Examples had sufficiently high sensitivity even in a range in which the concentration of lactic acid was low (a range in which the concentration of lactic acid was 0 mass % or more and 0.40 mass % or less). On the other hand, in the case of Comparative Examples, a satisfactory result was not obtained. More specifically, in the case of Comparative Examples, the concentration range in which the detection of the concentration of lactic acid can be stably performed was narrow. Further, in the case of Comparative Examples, the sensitivity was particularly poor in a range in which the concentration of lactic acid was low (a range in which the concentration of lactic acid was 0 mass % or more and 0.40 mass % or less).

The entire disclosure of Japanese Patent Application No. 2014-024909, filed Feb. 12, 2014 is expressly incorporated by reference herein.

What is claimed is:

1. A stimulus-responsive gel material, comprising:
a mixture including:
a first polymer containing an OH group and having a network structure;
a second polymer having a phenylboronic acid structure;
fine particles having an average particle diameter of 10 nm or more and 1000 nm or less; and
a solvent,
wherein the first and second polymers each have a cross-linked structure;
the first polymer contains N-hydroxyethylacrylamide as a constituent component; and
a polymer chain of the second polymer penetrates into the network of the first polymer.

2. The stimulus-responsive gel material according to claim 1,
wherein the material is capable of being put into the following states:
a first state in which the OH group of the first polymer and the phenylboronic acid structure of the second polymer are bonded to each other; and
a second state in which the bond between the OH group of the first polymer and the phenylboronic acid structure of the second polymer is dissociated, and
the wavelength of a reflected light from the material is different between the first state and the second state.

3. The stimulus-responsive gel material according to claim 1,
wherein the second polymer has a network structure.

4. The stimulus-responsive gel material according to claim 1,
wherein the material is put into the second state by reacting the phenylboronic acid structure of the second polymer and lactic acid with each other.

5. The stimulus-responsive gel material according to claim 1,
wherein the second polymer contains acrylamidephenylboronic acid as a constituent component.

6. The stimulus-responsive gel material according to claim 1,
wherein when the content of the first polymer is denoted by X1 (mass %) and the content of the second polymer is denoted by X2 (mass %), X1 and X2 satisfy the following relationship: $0.2 \leq X2/X1 \leq 8$.

7. The stimulus-responsive gel material according to claim 1,
wherein water is contained as the solvent.

* * * * *